Figure 3:
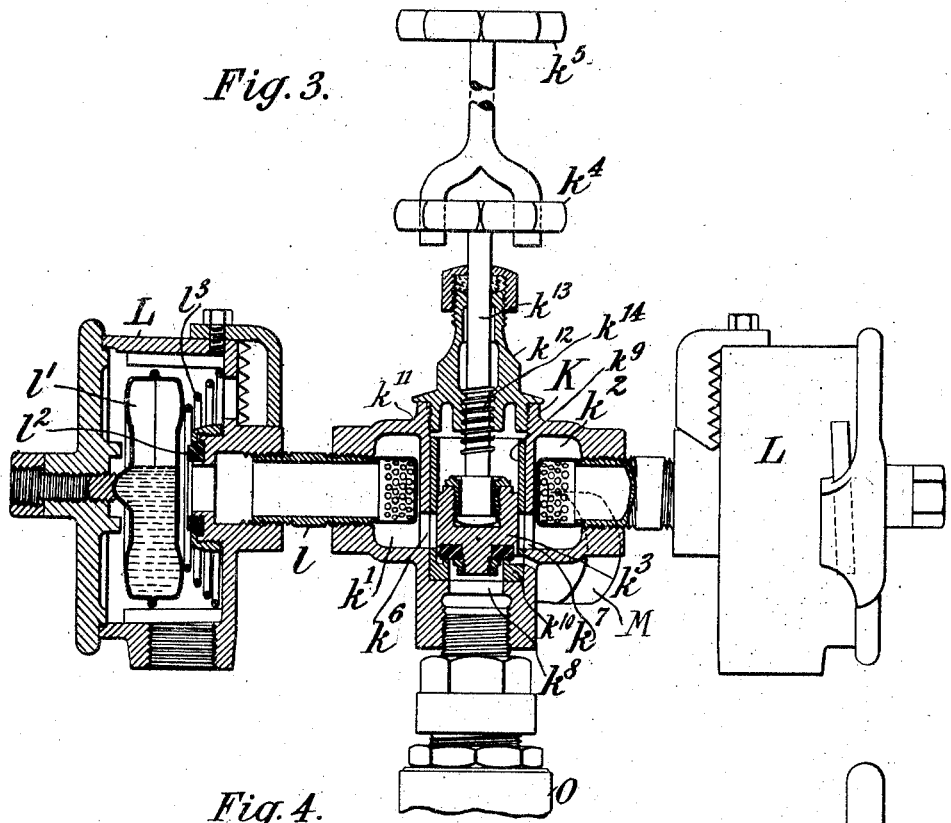

E. E. GOLD.
STEAM TRAP.
APPLICATION FILED JAN. 3, 1912.
1,043,046.
Patented Oct. 29, 1912.
3 SHEETS—SHEET 1.
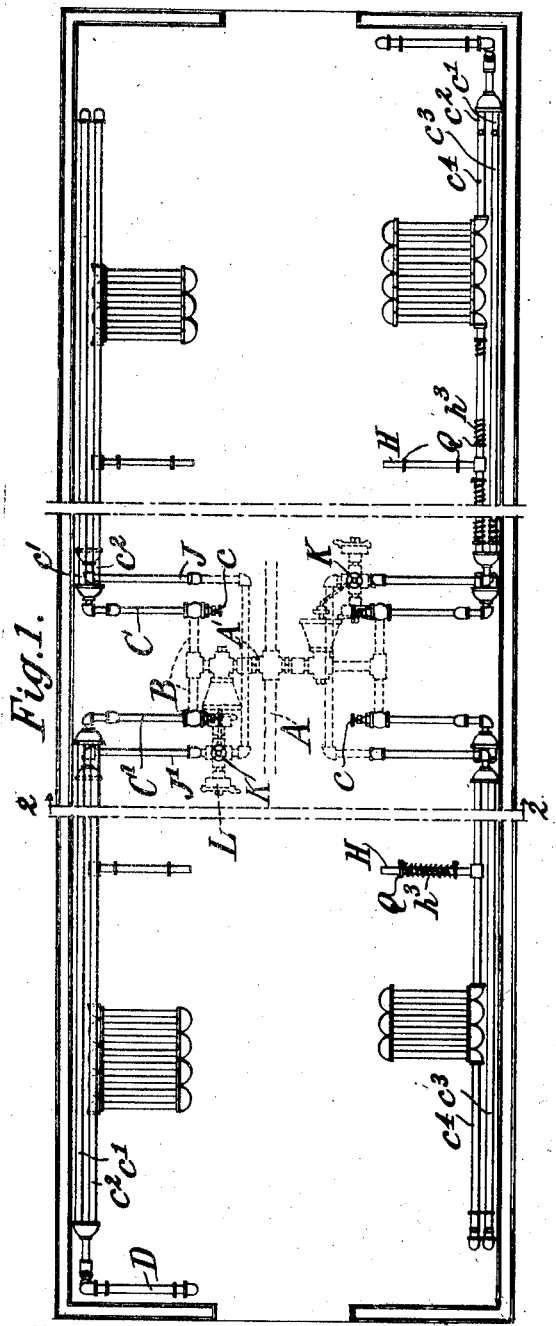
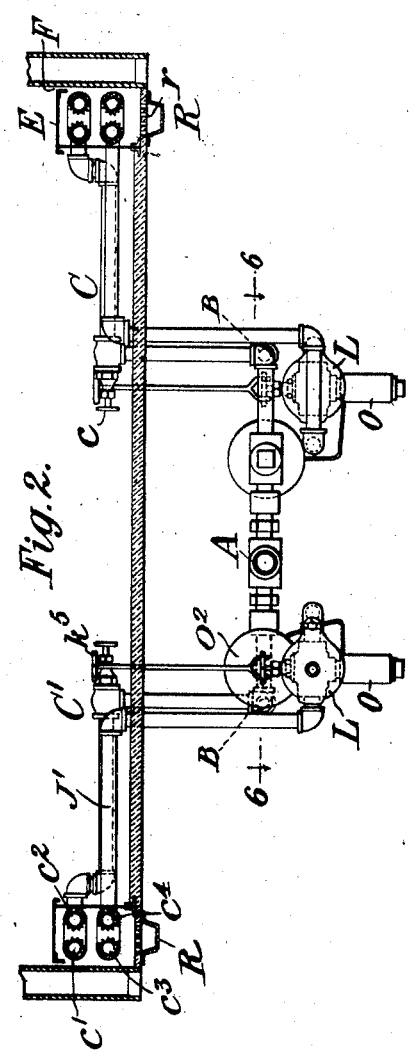
WITNESSES:
INVENTOR:
Edward E. Gold,
By Attorneys,

E. E. GOLD.
STEAM TRAP.
APPLICATION FILED JAN. 3, 1912.

1,043,046.

Patented Oct. 29, 1912.
3 SHEETS—SHEET 2.

WITNESSES:

INVENTOR:
Edward E. Gold,
By Attorneys.

E. E. GOLD.
STEAM TRAP.
APPLICATION FILED JAN. 3, 1912.
1,043,046.
Patented Oct. 29, 1912.
3 SHEETS—SHEET 3.
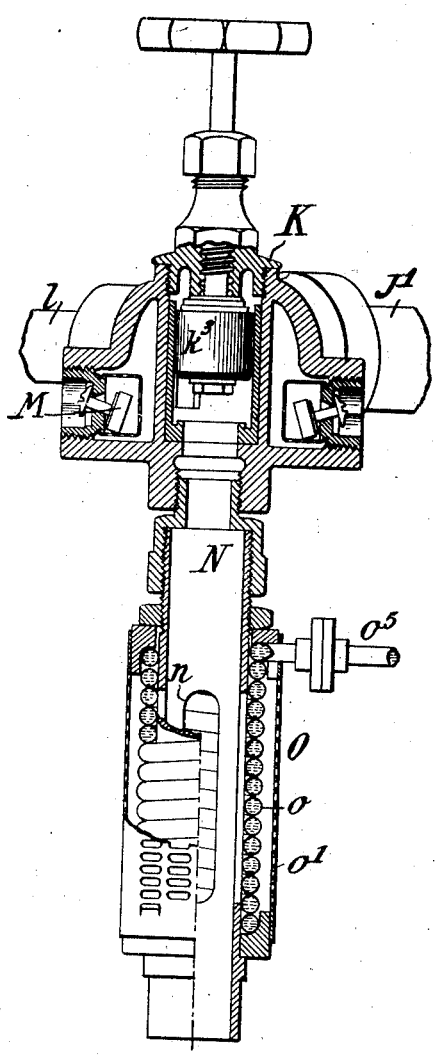
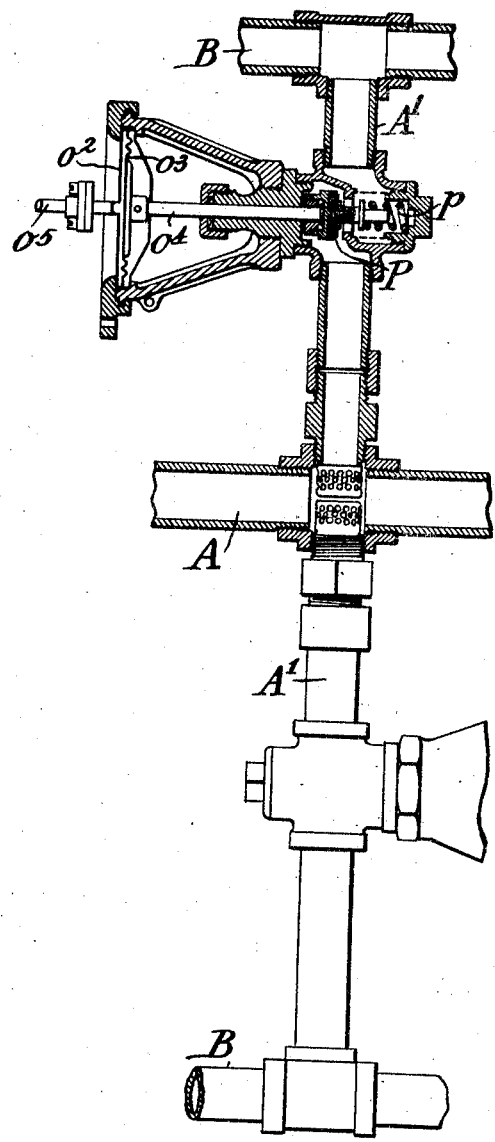
WITNESSES:
René Bruine
Fred White
INVENTOR:
Edward E. Gold
By Attorneys,
Fraser, Turk & Myles

UNITED STATES PATENT OFFICE.

EDWARD E. GOLD, OF NEW YORK, N. Y., ASSIGNOR TO GOLD CAR HEATING & LIGHTING COMPANY, OF NEW YORK, N. Y., A CORPORATION OF NEW YORK.

STEAM-TRAP.

1,043,046. Specification of Letters Patent. Patented Oct. 29, 1912.

Original application filed November 7, 1911, Serial No. 658,985. Divided and this application filed January 3, 1912. Serial No. 669,270.

*To all whom it may concern:*

Be it known that I, EDWARD E. GOLD, a citizen of the United States, residing in the borough of Manhattan, city, county, and State of New York, have invented certain new and useful Improvements in Steam-Traps, of which the following is a specification.

My invention relates to steam traps or valves, and although it illustrates a device of this character adapted for use in a steam heating system for heating railway cars, it is not limited to such use and may be otherwise used. It is a division of my application filed November 7, 1911, Ser. No. 658,985.

The object of my invention is to produce a trap through which a plurality of return pipes of steam heating systems may vent either through individual outlets, or through a common outlet.

A further object is to provide a trap by the use of which a plurality of radiating systems which have a common supply and individual return pipes, may be operated collectively, or as to any desired number as vapor systems or as pressure sytems.

A further object is to produce a trap which when employed as a common outlet for a plurality of radiating systems, will prevent back flow of steam to any closed system.

According to my invention a trap is provided wherein are contained a number of passages corresponding to the number of radiating systems. A connection is provided from each passage to the return pipe of one of such systems, and the passage is likewise connected to an outlet preferably having a T-trap. A gravity trap may also be advantageously connected to each passage. A port connects each passage with a common outlet, and a valve serves to open and close such communication. The common outlet has thermostatic means to control an inlet valve in the supply pipe.

In the accompanying drawings I have shown one way in which my invention may be usefully employed. Here it is illustrated as applied to a heating system employing a plurality of radiating systems in the car, either of which may be disconnected independently of the others, and which combined or singly are adapted to be operated as either pressure or vapor systems. A common supply pipe is provided having an inlet valve, and each radiating system has an independent return pipe. Each return pipe is connected to a passage in said trap and by adjustment of a valve therein each system may vent through its individual T-trap, whereupon the system will act as a pressure system, or all of said return pipes may vent through a common outlet in said trap, whereupon the thermostatic means controlled by the temperature in said outlet will automatically operate the valve in the inlet pipe, and the systems will collectively or as to all that are in operation, operate as vapor systems.

Figure 4:
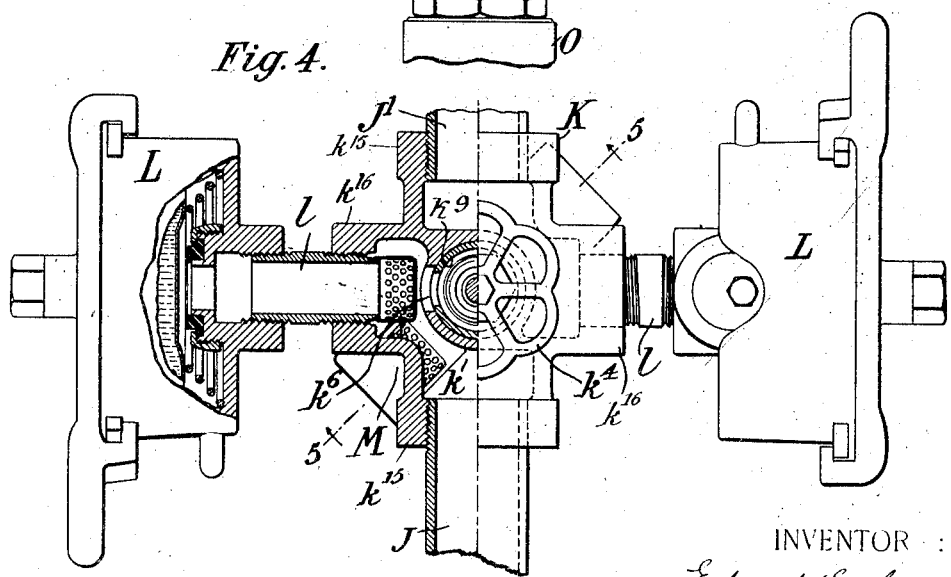

In the said drawings,—Figure 1 is a plan view of a steam heating system partly broken, the parts beneath the floor of the car being shown in dotted lines; Fig. 2 is a cross-section thereof on the line 2—2 in Fig. 1 looking toward the right; Fig. 3 is a view partly in elevation and partly in section of my improved trap; Fig. 4 is a further view of said trap and its connections partly in plan and partly in section; Fig. 5 is a view of the said trap partly in plan and partly in section on the line 5—5 in Fig. 4; Fig. 6 is a view of the parts of the steam heating systems below the car floor taken on the line 6—6 in Fig. 2, illustrating the said parts partly in plan and partly in section.

I have illustrated my invention as applied to a steam heating system wherein steam is supplied to the radiating systems located within the various cars from the train-pipe A which extends the length of the train, and is supplied with steam from the locomotive boiler. Branches A′ are connected to the said supply pipe and conduct steam therefrom to the supply pipe B which supplies steam to the radiating systems C C′ located within the car. Each of the said systems has a hand-controlled valve $c$ by which steam may be shut off from any one of the said systems. As illustrated in Fig. 1, each car contains four of such steam heating systems, each of which may be operated independently of the others, and they are illustrated as being divided so that two of such radiating systems are located upon each side of the car. Each of such radiating systems is illustrated as double branched, having branches $c^1$ $c^2$ each of which has a lower return pipe $c^3$ $c^4$. The return pipes $c^3$ $c^4$ are each connected to return pipes J J¹ which extend beneath the floor of the car and are there connected to a trap or valve K. The said valve is illustrated in Figs. 3, 4 and 5. It is provided with passages $k^1$ $k^2$ (Fig. 4) which extend from the said return pipes J J¹ to a screened pipe $l$ leading to traps L. The said traps L are ordinary thermostatically controlled T-traps for disposing of the condensation water, and their construction forms no part of the present invention. Gravity traps M may well be situated in communication with each of the said passages $k^1$ $k^2$. The valve K is provided with a central bore containing a sleeve $k^9$ in which slides the valve proper $k^3$ controlled by a handle $k^4$ or by its usual extension handle $k^5$. Ports $k^6$ $k^7$ connect the passages $k^1$ $k^2$ with said central bore when the valve $k^3$ is raised. A valve seat $k^{10}$ is formed at the lower end of said sleeve and receives valve $k^3$. The trap body $k^{11}$ has a threaded cap $k^{12}$ through which the valve stem $k^{13}$ passes, and which is interiorly threaded to correspond to the coarse thread $k^{14}$ on said stem. Threaded sockets $k^{15}$ $k^{16}$ receive the return pipes J J¹ and the T-trap connections $l$ respectively. A desirable manner in which said trap K may be used is as follows:—

It will be seen from the foregoing that when the steam escapes through the passages $k^1$ $k^2$ of the valve K and through the T-traps L, that the return pipes are entirely disconnected from each other and are independent in their operation. The T-trap contains a thermostatic vessel $l'$ which is partly filled with a volatile fluid and is adapted to expand when steam passes through the return pipe, and seat itself against the seat $l^2$, closing the pipe. When the condensed water collects and cools the thermostat it will contract and withdraw from seat $l^2$ under influence of spring $l^3$ and the pipe $l$ will then be open and permit the escape of the condensed water. The systems will then operate as pressure systems.

The following means enable the system to be operated as a vapor system:—The valve K is provided with an outlet $k^8$ communicating with the central bore when the valve $k^3$ is raised, and which when the system is operating as a pressure system, is closed by the valve $k^3$. This outlet communicates with a drip pipe or horn N, Fig. 5, which is open to the atmosphere at its lower end, and connected with which is a thermostat O. This as illustrated is composed of a coil $o$ wound about the horn and filled with a liquid which boils at a low temperature. A screen $o^1$ surrounds the said thermostat O to admit atmospheric air and render the same quickly responsive to changes in temperature. The drip pipe N has openings $n$ rendering the thermostat responsive to the temperature within the drip. The upper end of this coil $o$ is connected by tube $o^5$ to a thermostatic chamber $o^2$ having the usual diaphragm $o^3$ which bears upon the head of valve stem $o^4$, and closes the valve P in the steam supply pipe A¹. A spring $p$ maintains this valve normally open, and the thermostat O operates to close the valve against the pressure of this spring.

It will now be seen that upon the raising of the valve $k^3$ the condensed water and steam from the return pipes will be permitted to escape through ports $k^6$ $k^7$ which are then uncovered by the valve $k^3$, and to pass through outlet $k^8$ and out through the drip pipe N, and that the temperature of the said escaping water or steam will control the thermostat O and through it the valve P. Therefore when steam is escaping from the said return pipes the valve P will be closed, shutting off the supply of steam to each of the radiators C C¹, and when the water of condensation passes through the drip N at a sufficiently low temperature to permit it, the spring $p$ will cause the retraction of the valve P and an additional supply of steam will be permitted to flow into the radiators C C¹.

The radiating systems C C¹ have no communication with the atmosphere save through the traps L and M when the system is operating as a pressure system, or through said traps and the drip N when the system is operating as a vapor system, and the only connection which the said return pipes have with one another is through the trap K when the valve $k^3$ is raised. Therefore should it be desired to reduce the supply of heat in the car, and for this purpose one of the valves $c$ be closed, steam will not have access to the said closed radiating system. The radiating systems C C¹ are not open to the atmosphere or to each other save through trap K, and this will not permit a back flow of steam to any closed radiator. Gravity traps M and T-traps L will open as soon as a closed system becomes cool and restore atmospheric pressure, and if the valve $k^3$ should then be raised to permit any of the open radiators to work as vapor systems, any steam passing through the ports $k^6$ or $k^7$ would not pass to the closed radiators.

My improved trap is not limited in use to the particular heating system illustrated but may be used with other heating systems, or may be otherwise used. Nor is my invention limited to the employment of two passages which are designed for connection to two radiating systems, as this number may be increased. Furthermore although I have with some particularity described features of construction of said trap, I do not regard the precise construction important, as the structural features may be changed and equivalent devices employed within the limits of the following claims.

What I claim is:—

1. A valve having a plurality of separated passages, each passage adapted to connect to a return pipe and a trap, said valve having a common outlet, and ports, each port adapted to connect a passage with said outlet, a valve adapted when seated to close said outlet and said ports and to prevent communication between said passages, and when raised to permit free communication between said passages and said outlet.

2. A valve having partitions forming a plurality of separated peripheral passages therein, each passage adapted to connect to a return pipe and a trap, the inner wall of said passages providing a centrally disposed bore which is adapted to communicate with a common outlet, said interior wall being provided with ports each port adapted to connect a passage with said bore, a valve located in said bore adapted when seated to close said outlet and said ports and prevent communication between said passages, and when raised to open said ports and said outlet.

3. A valve body having a plurality of separated passages therein each terminating in an open end, an interior wall having a central bore, said wall provided with ports, each port adapted to connect a passage with said bore and also with an outlet adapted to communicate with said bore, a valve proper adapted when seated to close said outlet and said ports and when open to establish communication between said passages and said outlet.

4. A valve body having partitions forming a plurality of passages therein adapted to be disconnected each terminating in an open end, and also having a central bore, a gravity trap connected with each passage, said valve provided with a port adapted to connect each passage with said bore, and also with an outlet adapted to communicate with said bore, a valve proper adapted when seated to close said outlet, and said ports, and when open to establish communication between said passages and said outlet.

5. A valve body having a plurality of passages therein each terminating in an open end, and also having a central bore, a trap connected to one end of each of said passages and thermostatically operated means controlled by the temperature in said trap for closing same, said valve provided with a port adapted to connect each passage with said bore, and also with an outlet adapted to communicate with said bore, a valve proper adapted when seated to close said outlet, and said ports, and when open to establish communication between said passages and said outlet.

6. A valve body having a plurality of passages therein each terminating in an open end, and also having a central bore, said valve provided with ports, each port adapted to connect a passage with said bore and said valve also provided with an outlet adapted to communicate with said bore, a valve proper adapted when seated to close said outlet and said ports and when open to establish communication between said passages and said outlet, a drip connected to the outlet of said trap, and a thermostat operatively connected therewith and controlled by the temperature therein.

7. A valve structure comprising a valve body having a central bore, a sleeve therein, a valve adjustably mounted in said sleeve, said valve body having a plurality of passages and sockets adapted to receive pipes and communicating with each end of each passage, said valve body and sleeve having ports adapted to open communication between said passages and said bore, a seat for said valve in said sleeve, said valve adapted when raised to open communication between all said passages and said outlet, and when seated to close said communication.

8. A valve structure comprising a valve body having a central bore, a sleeve therein, a valve adjustably mounted in said sleeve, said valve body having a plurality of passages and sockets adapted to receive pipes and communicating with each end of each passage, gravity traps communicating with each passage, said valve body and sleeve having ports adapted to open communication between said passages and said bore, a seat for said valve in said sleeve, said valve adapted when raised to open communication between all said passages and said outlet, and when seated to close said communication.

9. A valve structure comprising a valve body having a central bore, a sleeve therein, a valve adjustably mounted in said sleeve, said valve body having a plurality of passages and sockets adapted to receive pipes and communicating with each end of each passage, gravity traps communicating with each passage, a T-trap connected to one end of each of said passages having a thermostatically operated means controlled by the temperature in said trap for closing the outlet from said passage, said valve body and sleeve having ports adapted to open communication between said passages and said bore, a seat for said valve in said sleeve, said valve adapted when raised to open communication between all said passages and said outlet, and when seated to close said communication.

10. A valve provided with an interior wall forming a bore, and having a plurality of separated passages formed between said wall and the valve shell, each passage adapted for connection to a pipe at each end, an outlet adapted to communicate with said bore, and said interior wall having ports adapted to establish communication between said passages and said bore and outlet, a valve in said bore adapted when seated to close said ports and outlet and to close communication between said passages and when raised to open said ports and outlet.

11. A valve body having interior partitions forming a plurality of separated passages, each passage adapted for connection at one end to a return pipe and at the other end to a trap, said valve body formed with an outlet and an outlet valve adapted to control said outlet, means for establishing communication between each of said passages and said outlet likewise controlled by said outlet valve, whereby each of said passages is brought into communication with said outlet when said outlet valve is raised, and communication between said passages is closed when said outlet valve is lowered.

In witness whereof, I have hereunto signed my name in the presence of two subscribing witnesses.

EDWARD E. GOLD.

Witnesses:
HENRY M. TURK,
THOMAS F. WALLACE.